Oct. 8, 1940.   M. L. TAYLOR   2,217,299
INFLATION APPARATUS AND CONTROL MEANS THEREFOR
Filed Jan. 19, 1940
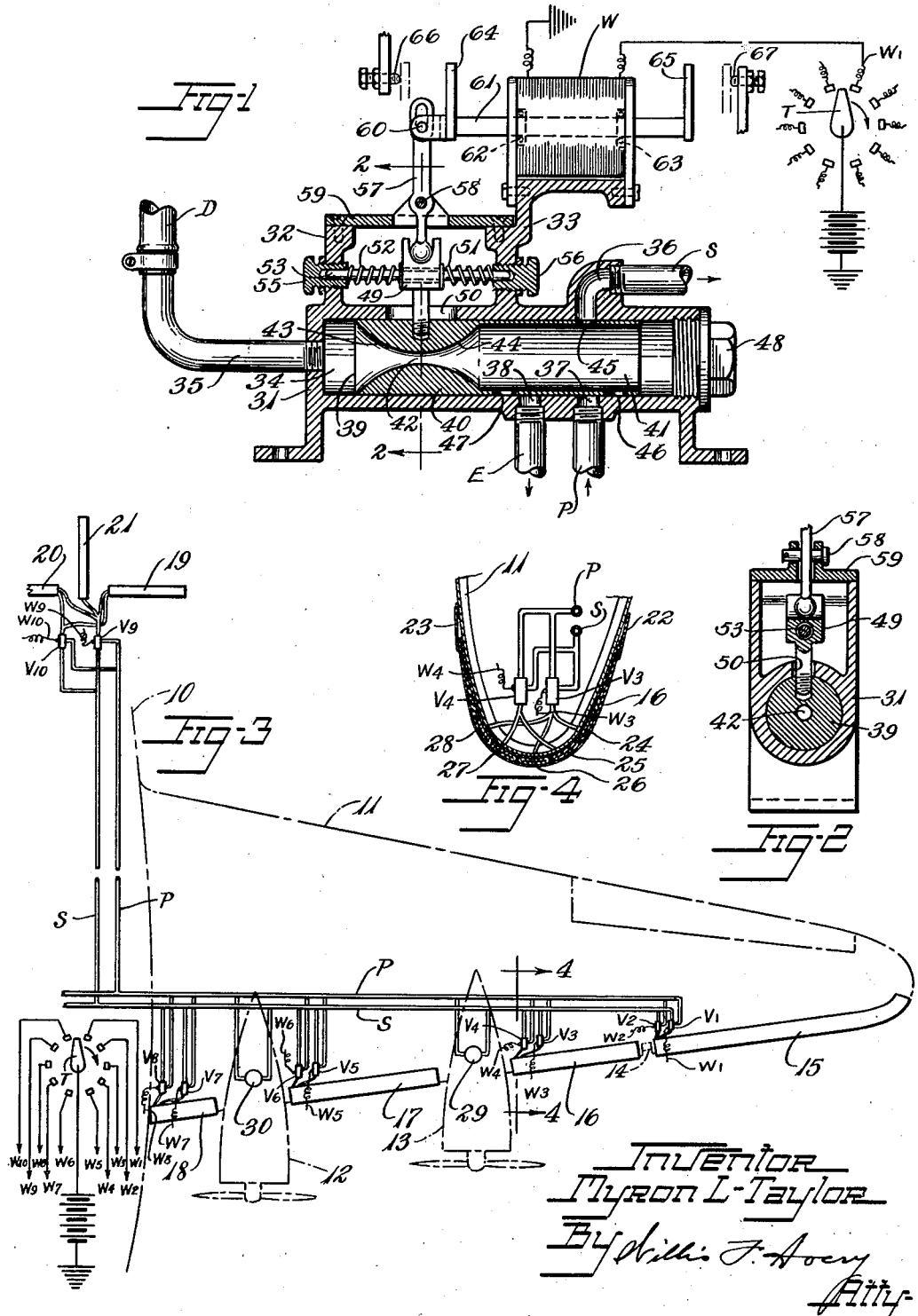
Inventor
Myron L. Taylor Patented Oct. 8, 1940

2,217,299

UNITED STATES PATENT OFFICE 2,217,299

INFLATION APPARATUS AND CONTROL MEANS THEREFOR

Myron L. Taylor, Hudson, Ohio, assignor to The B. F. Goodrich Company, New York, N. Y., a corporation of New York Application January 19, 1940, Serial No. 314,618

9 Claims. (Cl. 244—134)

This invention to apparatus for inflating extensible units and to means for controlling the inflation. The invention is suitable especially for use in connection with inflatable units or shoes mounted upon airplane wings and other airfoils and surfaces of air craft for the purpose of preventing the accumulation of ice.

It has been proposed heretofore to provide a plurality of such inflatable units upon a wing of the aircraft and to operate such units in alternation so that any reduction in the lift-drag ratio caused by the extension of the unit upon inflation will apply to only a portion of the wing at a time and the reduction in the lift-drag ratio will be minimized as to the wing as a whole and will be smooth rather than erratic.

The provision of a central distributing mechanism for controlling the supply of air under under pressure to the individual units and the exhaust and suction therefrom has the objection of necessitating the installation of extensive piping between each unit and the central distributing mechanism, adding weight to the aircraft and occupying precious space.

In order to supply air under pressure to each inflatable unit and in order to apply suction to each unit to maintain its deflated condition in the intervals between intermittent inflations two main pipe lines are required, one a pressure line and the other a suction line. Proposals heretofore for a two-line system have involved the expedient of individual control valves at the inflatable units which valves and the operating gear therefor have been somewhat complex and heavy.

Objects of the present invention are to provide simplicity in the control and operation of each individual inflatable unit so that the advantages of the two-line system may be availed of to a maximum; to provide for alternating cyclic inflations and deflations of the units by improved action that is largely automatic at each unit, so that a minimum of operating connections and mechanism whether they be electrical, mechanical, hydraulic or pneumatic, are required at each unit and between it and a central timing mechanism; to provide valve mechanism operated by change in the rate of flow of air into and out of the inflatable unit and to provide for simplicity of apparatus and light weight.

A further object is to provide for automatic operation such that the time intervals for the inflation and exhaust phases as they actually occur will be commensurate in duration with the actual requirements for the individual units, even though the units are of varying air capacities.

These and further objects will be apparent from the following description, reference being had to the accompanying drawing in which:

Fig. 1 is a vertical section through control valve mechanism constructed according to and embodying the invention.

Fig. 2 is a section taken along the line 2—2 of Fig. 1.

Fig. 3 is a diagrammatic plan view of one side of an airplane showing a system of inflatable units connected for operation in accordance with the invention, the outline of the airplane wing with motors and part of the fuselage being shown in broken lines.

Fig. 4 is a section of the airplane wing taken along the line 4—4 of Fig. 3.

Referring first to Figs. 3 and 4, the invention is illustrated as applied to an airplane comprising a fuselage 10 having wings, one of which is shown at 11, carrying motor nacelles 12 and 13, and landing lights 14 outwardly spaced from the outboard nacelles 13. A plurality of inflatable members is mounted at the leading edge of the wing, there being four such members in the illustrated embodiment, including a member 15 extending from the wing tip to the landing light 14, and a second member 16 between the landing light and the outboard nacelle 13, a third member 17 between the two nacelles 13 and 12, and a fourth member 18 between the inboard nacelle 12 and the fuselage 10. The wing at the opposite side of the fuselage has similar inflatable members correspondingly located, and at the tail group there is provided a pair of inflatable members 19 and 20 for the horizontal stabilizers and an inflatable member 21 for the vertical stabilizer.

Each inflatable member comprises an extensible elastic structure of rubber or other rubber-like material suitably reinforced and attached to the airfoil surface at its upper and lower margins which are covered preferably by upper and lower fairing strips 22, 23. Each inflatable member includes one or more inflatable tubes, there being five such tubes 24, 25, 26, 27, and 28 (Fig. 4), in the member 16 and preferably in each of the four members on the wing. The inflatable members 19 and 20 of the horizontal stabilizers may include a group of three tubes and the inflatable members 21 for the vertical stabilizers may include only one tube, the number of tubes being provided in accordance with the thickness of the leading edge of the airfoil.

The tubes of each unit in the members where more than one tube is provided, are inflated by groups of the tubes in alternation. In the member 16, for example, upper and lower tubes 24 and 28 and intermediate tube 26 are inflated and deflated together and this group is inflated and deflated in alternation with the remaining tubes 25 and 27 as a group. Such operation provides effective ice removal without excessive reduction in the lift-drag ratio when the tubes are inflated. For like reasons the middle one of the three tubes of each of the inflatable members 19 and 20 of the tail group may be inflated and deflated together and the two other tubes of each of these members may be inflated and deflated together in alternation with the first tubes.

Further, it is desirable to inflate only one inflatable member or only a few of those on the wing at one time so that any aerodynamic disturbance caused by such inflation will affect only the zone of the wing occupied by the inflated members and the remainder of the wing span will be unaffected. In the arrangement illustrated this result is obtained by a division into ten inflatable elements, each element being regarded as a tube or a group of tubes of an inflatable member. The ten successive inflations of a cycle may consist of successive inflations of each of the two groups of tubes in each of the four inflatable members on the wing, followed by successive inflations of the two groups of tubes of the tail members 19 and 20. The member 21 may be included with one of the groups of elements of the members 19 and 20.

Air pressure and air suction is supplied by a pressure line P and a suction line S extending to all inflatable members on the wings and to the inflatable members on the tail group, the pressure line P being connected to the pressure side of pumps 29 and 30 in the motor nacelles, and the suction line S being connected to the suction side of said pumps or other suction source.

Each inflatable element (tube or a group of tubes) is connected to the pressure line and suction line through a valve which, in accordance with the invention, is adapted to effect the successive three-phase operations of inflation, exhaust to atmosphere, and suction. The apparatus of the invention is such that upon starting impulses from a central timing source, the actual successive operations of the valve are under the control largely of the rate of flow of air into and out of the inflatable element. In the illustrated embodiment wherein the system is divided into ten inflatable elements, ten valves are provided, indicated at V—1 through V—10 inclusive. For symmetrical operation with respect to the two rings, valves V—1 through V—8 inclusive are duplicated for the inflatable elements on the other wing.

The valves may all be of identical construction, and only one, for example the valve V—1, need be described. Referring to Figs. 1 and 2, the valve comprises a housing 31 having on its upper side brackets 32 and 33 for supporting operating parts. The housing includes a valve chamber 34 having at one end a pipe connection 35 with a pipe D leading to the inflatable element, and adjacent the other end a port 36 connected to the suction line S, and port 37 connected to the pressure line P and a port 38 connected to an exhaust pipe E opening to the atmosphere. Within the chamber 34 is mounted for free sliding movement a valve 39 comprising as a unit a constricted portion 40 and an apertured sleeve portion 41. The constricted portion 40 has a throat 42 and diverging mouth portions 43, 44 at the two sides of the throat. The sleeve portion 41 has an aperture 45 adapted to put the suction port 36 into connection with the chamber, an aperture 46 for the pressure port 37, and an aperture 47 for the exhaust port 38. One end of the housing may have a detachable plug 48 for permitting access to the valve.

At the upper side of the valve is mounted for movement therewith a cross-head 49 reciprocable in a slot 50 in the housing and urged to a center neutral position by light compression springs 51, 52 mounted upon a pin 53, upon which the cross-head slides freely, and supported by end adjusting screws 55 and 56 to permit centering of the cross-head and adjustment of the springs.

The upper end of the cross-head has a ball and socket connection with a lever 57 pivoted at 58 to a plate 59 supported by brackets 32, 33. The upper end of the lever 57 has a pivotal connection at 60 with a plunger 61 freely movable back and forth in the horizontal direction within a solenoid W. Anti-friction bearings 62, 63 may be provided to support the plunger 61 with minimum resistance to movement. The extent of horizontal movement of the plunger 61 together with the lever 57, cross-head 49 and valve 39, is limited by arms 64, 65 on the plunger engageable with adjustable stops 66, 67 suitably positioned with respect to such arms.

The solenoid of each valve is connected to one of a plurality of taps of a central timing mechanism so that as contact is made in timed relation a current impulse will be sent through the solenoids of the valves to give starting impulses successively, as will be seen from the wiring diagrams of Figs. 1 and 3.

In the position of the parts of Fig. 1 the inflatable element is in connection with the suction line S through the pipe D, connection 35, chamber 34, restricted portion 42 of the valve, sleeve 39 and aperture 45. When the timer arm T makes connection with the tap W—1 of this particular valve the solenoid kicks plunger 61 to the right as viewed in Fig. 1, which in turn moves valve 39 to the left, closing the suction connection 36 and opening the chamber to pressure line P through aperture 46. A rush of air from the pressure line causes inflation of the inflatable element and this rush of air through the restricted valve portion 42 maintains the valve in its left hand position even after connection of the timer arm T with tap W—1 has been broken.

As the inflation of the inflatable element is completed the rush of air through the valve stops, and because the rate of flow of the air through the valve thus drops the dynamic force of the flow ceases and the valve is caused to return to its neutral position of Fig. 1 under the influence of spring 52. Upon this return to neutral position by the valve the suction port 36 is again open, while the connection with the pressure line P is closed. The inflatable element then commences to deflate by a rush of air through the valve into the suction line. This rush of air through the constricted portion of the valve sets up a dynamic force urging the valve to the right in Fig. 1, which results in a closing of the suction port 36 and an opening of the exhaust port 38 through aperture 47 in the sleeve portion. The air continues to flow through the exhaust port until the inflatable element is deflated whereupon, by the cessation of flow through the restricted portion of the valve the dynamic force on the valve ceases and it is returned to its neutral position of Fig. 1 under the influence of spring 51. In this position of the parts the pressure and exhaust ports are closed and the inflatable element is again connected with the suction line in which position the inflatable element is held deflated until the next closing of connection of the timer switch tap W—I to start the next cycle of operation. It will be seen that the action of the distributor, valve hereinabove described is such that the time intervals for the inflation and exhaust phases as they actually occur will be commensurate in duration with the actual requirements for the individual units, even though the units are of varying air capacities.

It will be seen from the foregoing that after a starting impulse the valve operates under the force and control of the rate of flow of air into and out of the inflatable element. The mechanism for the purpose may be of simple construction, compact size and light weight. As the inflation valve is opened by a snap-action, inflation is sudden, which makes for better action of the inflatable element in removing ice.

While the invention has been described with reference to a ten-element system in which the elements are operated successively, it will be understood that the order of operation and the number of elements operating at one time may be altered as desired, and a smaller or greater number of elements may be provided.

Variations may be made without departing from the scope of the invention as it is defined in the following claims.

I claim:

1. Control apparatus for an inflatable element, said apparatus comprising inflation pressure inlet means, outlet means, and means controlled by the rate of flow of the inflation medium into the element for connecting the element with said outlet means upon inflation of the element.

2. Control apparatus for an inflatable element, said apparatus comprising inflation pressure inlet means, outlet means, timing means for starting inflation of the element, and means controlled by the rate of flow of the inflation medium into the element for connecting the element with said outlet means upon inflation of the element.

3. Control apparatus for an inflatable element, said apparatus comprising inflation pressure inlet means, exhaust means, means for connecting the element to suction, and means controlled by the rate of flow of the inflation medium into and out of the element for connecting the element successively to the exhaust means and the suction connection upon inflation of the element.

4. Control apparatus for an inflatable element, said apparatus comprising inflation pressure inlet means, exhaust means, means for connecting the element to suction, timing means for starting inflation of the element, and means controlled by the rate of flow of the inflation medium into and out of the element for connecting the element successively to the exhaust means and the suction connection upon inflation of the element.

5. A system of inflation units comprising a plurality of inflatable units, an inflation pressure line common to the units, valve means individual to each unit and interposed between said pressure line and the unit, outlet connections for the units, and means for moving the valve means of the respective units in alternation to start inflation pressure into the units in alternation, each of the valve means comprising means controlled by the rate of flow of the inflation medium into the unit for connecting the unit to the outlet means upon inflation of the element.

6. A system of inflation units comprising a plurality of inflatable units, an inflation pressure line and a suction line common to the units, valve means individual to each unit and interposed between said pressure and suction lines and the unit, individual exhaust connections for the units, and means for mounting the valve means of the respective units in alternation to start inflation pressure into the units in alternation, each of the valve means comprising means controlled by the rate of flow of the inflation medium into the unit for connecting the unit successively to the exhaust connection and the suction line upon inflation of the element.

7. Valve apparatus for controlling the flow of an inflation medium into and out of an inflatable element, said apparatus comprising a valve chamber, said chamber having a connection for an inflatable element, a pressure inlet connection and an outlet connection, valve means in said chamber movable to open the element connection in alternation to the other said connections means for moving said valve means to open the element connection to said pressure inlet connection, and means controlled by the rate of flow of the inflation medium through the valve means for moving said valve means to open said element connection to the outlet connection upon inflation of the element.

8. Valve apparatus for controlling the flow of an inflation medium into and out of an inflatable element, said apparatus comprising a valve chamber, said chamber having a connection for an inflatable element, a pressure inlet connection, an exhaust connection and a suction connection, valve means in said chamber movable to open the element connection in alternation to the other said connections, means for moving said valve means to open the element connection to said pressure inlet connection, and means controlled by the rate of flow of the inflation medium through the valve means for moving said valve means to open said element connection successively to the exhaust connection and the suction connection upon inflation of the element.

9. Valve apparatus as defined in claim 8 in which the said valve means comprises an element for the passage of air having a restricted throat and opposed mouths diverging therefrom.

MYRON L. TAYLOR.